US012718422B2

(12) United States Patent
Chu et al.

(10) Patent No.: US 12,718,422 B2
(45) Date of Patent: Aug. 25, 2026

(54) METHOD FOR GENERATING TRAFFIC EVENT VIDEO

(71) Applicant: Industrial Technology Research Institute, Hsinchu (TW)

(72) Inventors: Hung-Kuo Chu, Hsinchu City (TW); Cheng-Hua Lin, New Taipei City (TW); Sheng-Yao Wang, New Taipei City (TW); Chia-Hao Yu, Kaohsiung City (TW)

(73) Assignee: Industrial Technology Research Institute, Hsinchu (TW)

( * ) Notice: Subject to any disclaimer, the term of this patent is extended or adjusted under 35 U.S.C. 154(b) by 223 days.

(21) Appl. No.: 18/303,569

(22) Filed: Apr. 20, 2023

(65) Prior Publication Data

US 2024/0212224 A1 Jun. 27, 2024

(30) Foreign Application Priority Data

Dec. 21, 2022 (TW) ................................ 111149152

(51) Int. Cl.
*G06T 11/00* (2026.01)
*G06T 7/246* (2017.01)

(52) U.S. Cl.
CPC .............. *G06T 11/00* (2013.01); *G06T 7/248* (2017.01); *G06T 2207/10016* (2013.01); *G06T 2207/30241* (2013.01)

(58) Field of Classification Search
CPC ................................ G06T 11/00; G06T 7/248
See application file for complete search history.

(56) References Cited

U.S. PATENT DOCUMENTS 10,210,617 B2 2/2019 Hovis et al.
10,988,023 B2 4/2021 Tsuda
(Continued)

FOREIGN PATENT DOCUMENTS

CN 110413905 11/2019
CN 110537210 12/2019
(Continued)

OTHER PUBLICATIONS

"Office Action of Taiwan Counterpart Application", issued on Sep. 13, 2023, p. 1-p. 9.
(Continued)

*Primary Examiner* — Yi Yang
(74) *Attorney, Agent, or Firm* — JCIPRNET

(57) ABSTRACT

A method for generating a traffic event video includes the following. Map alignment of a set of moving trajectory coordinates corresponding to a moving video with an electronic map is performed, and a set of trajectory map information corresponding to the moving trajectory coordinates is obtained from the electronic map. At least one event map information conforming to an event trajectory model from the set of trajectory map information and a plurality of image frame information of the moving video corresponding to the image frame information of the trajectory map information are obtained, and a plurality of location information of a virtual object is generated according to the event trajectory model. A video segment is extracted from the moving video based on the image frame information, and the virtual object and the video segment are synthesized based on the location information to generate a traffic event video corresponding to the event trajectory model.

12 Claims, 7 Drawing Sheets

(56) References Cited

U.S. PATENT DOCUMENTS

| | | | | |
|---|---|---|---|---|
| 2010/0232404 | A1* | 9/2010 | Chen | H04W 4/44 370/470 |
| 2017/0236284 | A1* | 8/2017 | Elliethy | G06T 7/33 382/294 |
| 2018/0330610 | A1* | 11/2018 | Wu | G08G 1/164 |
| 2019/0108768 | A1* | 4/2019 | Mohamed | G09B 9/052 |
| 2020/0033885 | A1 | 1/2020 | Kim | |
| 2020/0182633 | A1* | 6/2020 | Liu | G01C 21/3407 |
| 2021/0380133 | A1* | 12/2021 | Narang | B60W 60/0011 |
| 2022/0222982 | A1 | 7/2022 | Liu et al. | |

FOREIGN PATENT DOCUMENTS

| | | |
|---|---|---|
| CN | 111505965 | 8/2020 |
| CN | 114255260 | 3/2022 |
| CN | 114638148 | 6/2022 |
| CN | 115344503 | 11/2022 |
| TW | 200926033 | 6/2009 |
| TW | I668141 | 8/2019 |
| TW | I715898 | 1/2021 |
| TW | 202121334 | 6/2021 |
| TW | I734186 | 7/2021 |
| TW | I742710 | 10/2021 |
| TW | I743837 | 10/2021 |
| TW | M625044 | 4/2022 |

OTHER PUBLICATIONS

Jonathan Will et al., "Training Data Reduction for Performance Models of Data Analytics Jobs in the Cloud", 2021 IEEE International Conference on Big Data (Big Data), Dec. 15-18, 2021, pp. 3141-3146.

Gaurav Kumar Nayak et al., "Mining Data Impressions from Deep Models as Substitute for the Unavailable Training Data", IEEE Transactions on Pattern Analysis and Machine Intelligence, vol. 44, No. 11, Nov. 2022, pp. 8465-8481.

Sung-Su Jang et al., "High Quality Training Set Collection using Generative Adversarial Network", 2020 IEEE International Conference on Big Data and Smart Computing (BigComp), Feb. 19-22, 2020, pp. 455-458.

Chai Guobei et al., "Method for generating infrared big data for deep learning algorithm training by using small sample data", 2019 IEEE International Conference on Signal, Information and Data Processing (ICSIDP), Dec. 11-13, 2019, pp. 1-5.

Nikodimos Provatas et al., "Towards Faster Distributed Deep Learning Using Data Hashing Techniques", 2019 IEEE International Conference on Big Data (Big Data), Dec. 9-12, 2019, pp. 6189-6191.

* cited by examiner

Map alignment step S205

Event adaptation step S210

Video generation step S215

METHOD FOR GENERATING TRAFFIC EVENT VIDEO

CROSS-REFERENCE TO RELATED APPLICATION

This application claims the priority benefit of Taiwanese application no. 111149152, filed on Dec. 21, 2022. The entirety of the above-mentioned patent application is hereby incorporated by reference herein and made a part of this specification.

BACKGROUND

Technical Field

The technical field relates to a method for generating a traffic event video.

Background

With the development of science and technology, automated driving technology has been proposed to prevent traffic accidents caused by human errors. In automated driving technology, the surrounding environment is sensed by a sensor and automatic navigation is possible. To enhance safety in an automated driving function, a sufficient training data set is required for training and verification of a deep learning model. However, it takes an amount of time to record the required training data set during general vehicle training. In other words, recording of each scene or each weather type on the actual spot is required. Furthermore, collecting corner-cases is not easy, and the related cost is also relatively high.

There are currently two manners for collecting corner-cases during the training phase of a self-driving car as follows. First: videos of corner-cases that have actually occurred are collected as the training data set. However, videos of dashboard cameras are collected through the network in general, so the cost of screening is high, and it is unlikely to obtain high-quality and suitable videos. In addition, it is unlikely to standardize video quality of the actual videos collected from the Internet, adjust the lens, and customize the corner-cases. Moreover, there is a lack of videos with the involved car serving as the corner-case. Second: the training data set is generated by scripting a vehicle simulator. In the second manner, although the videos may be customized, the cost is relatively high. Production of an increasingly fine virtual video requires an increasing amount of time. In addition, the videos obtained from the second manner are virtual videos with relatively low authenticity, which may affect subsequent training results.

SUMMARY

The disclosure provides a method for generating a traffic event video, which provide a large number of diverse training materials with a high price-performance ratio when combined with real scenes and virtual objects.

In an embodiment of the disclosure, a method for generating a traffic event video is performed by a processor. The method includes: a map alignment step; an event adaptation step; and a video generation step. In the map alignment step, a set of moving trajectory coordinates corresponding to a moving video is map aligned with an electronic map to obtain a set of trajectory map information corresponding to the set of moving trajectory coordinates from the electronic map. In the event adaptation step, at least one event map information conforming to an event trajectory model from the set of trajectory map information and a plurality of image frame information of the moving video corresponding to the at least one event map information of the set of trajectory map information are obtained, and a plurality of location information of a virtual object is generated according to the event trajectory model. In the video generation step, a video segment is extracted from the moving video based on the plurality of image frame information, and the virtual object and the video segment are synthesized based on the plurality of location information of the virtual object to generate a traffic event video corresponding to the event trajectory model.

Based on the foregoing, in an embodiment of the disclosure, the video segment conforming to the event trajectory model is extracted from the actually captured moving video, and the video segment and the virtual object are synthesized to obtain the traffic event video. Accordingly, the same moving video may be utilized multiple times to obtain a large number of traffic event videos in different scenarios.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figures 1, 2:
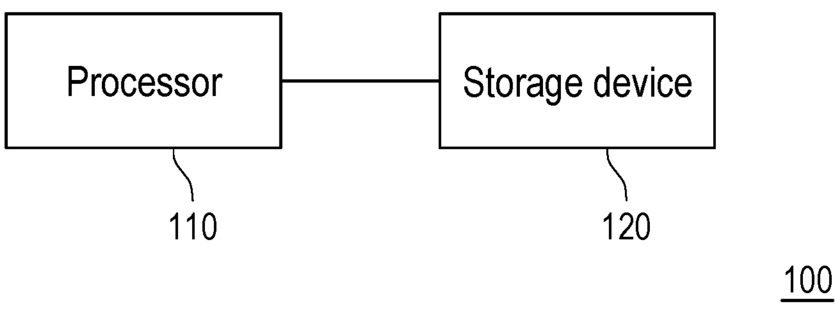
FIG. 1 is a block diagram of an electronic device according to an embodiment of the disclosure.
FIG. 2 is a flowchart of a method for generating a traffic event video according to an embodiment of the disclosure.

FIG. 1 is a block diagram of an electronic device according to an embodiment of the disclosure. With reference to FIG. 1, an electronic device 100 may be realized by adopting any electronic device with a computing function. A training data set required by the self-driving car industry is mass-produced through the electronic device 100. The electronic device 100 includes at least a processor 110 and a storage device 120. The processor 110 is coupled to the storage device 120.

The processor 110 is, for example, a central processing unit (CPU), a physics processing unit (PPU), a programmable microprocessor, an embedded control chip, a digital signal processor (DSP), an application specific integrated circuit (ASIC), or other similar devices.

The storage device 120 is, for example, any type of fixed or removable random access memory (RAM), read-only memory (ROM), flash memory, hard disk drive, or other similar devices or a combination of these devices. One or more programming code snippets are stored in the storage device 120. After the programming code snippets are installed, the following method for generating a traffic event video is performed by the processor 110.

FIG. 2 is a flowchart of a method for generating a traffic event video according to an embodiment of the disclosure. With reference to FIG. 2, this embodiment is mainly divided into three phases, namely a map alignment step S205, an event adaptation step S210, and a video generation step S215.

In the map alignment step S205, the processor 110 map aligns a set of moving trajectory coordinates corresponding to a moving video with an electronic map to obtain a set of trajectory map information (waypoint) corresponding to the set of moving trajectory coordinates from the electronic map. Here, the set of moving trajectory coordinates includes a plurality of moving trajectory coordinates obtained at a plurality of sampling time points. Map alignment is used to find actual coordinates corresponding to each of the moving trajectory coordinates in the actual electronic map.

Here, the electronic map is obtained, for example, from map databases constructed by governments of various countries. As a result, map information (waypoint) provided by the electronic map includes road information such as road coordinates, road identification codes, and road widths of multiple actual roads, and intersection information such as intersection coordinates of a plurality of intersections and road identification codes to which each intersection is connected.

The processor 110 map aligns the moving trajectory coordinate corresponding to each image frame included in the moving video with the electronic map to find the trajectory map information corresponding to the moving trajectory coordinates, that is, the road information and/or intersection information of the location corresponding to the moving trajectory coordinates, in the electronic map to form the set of trajectory map information by the found trajectory map information. The moving video and the electronic map may be associated via map alignment.

Next, in the event adaptation step S210, the processor 110 obtains a plurality of event map information conforming to an event trajectory model from the set of trajectory map information and a plurality of image frame information of the moving video corresponding to the event map information of the set of trajectory map information, and generates a plurality of location information of a virtual object according to the event trajectory model. In this embodiment, the virtual object is at least one virtual vehicle, and the image frame information is a timestamp of the image frame, for example.

The event trajectory model includes an event type, an event period, and event path information. Taking the traffic event video as a training material of a traffic event, the event trajectory model is a model for constructing an event road condition and a trajectory of a traffic event. In an embodiment, the event type includes types of traffic events that may occur to a vehicle on the road, such as a road event or an intersection event. The path information includes an angle range, a width range, and a moving speed range. Moreover, the event type has corresponding vehicle trajectory information. The vehicle trajectory information is used to indicate trajectory information of at least one virtual vehicle. The virtual vehicle includes at least one of an EGO-vehicle and an external vehicle (non-ego traffic vehicle, hereinafter referred to as NEGO-vehicle). The NEGO-vehicle refers to an event-related non-ego traffic vehicle other than the EGO-vehicle.

The road event refers to an event that occurs on a straight road such as lead vehicle stopped (LVS), opposite direction collision, or drifting. LVS refers to a collision occurring in a case where an EGO-vehicle goes straight and follows behind a colliding vehicle that stops abruptly. Opposite direction collision refers to a collision between an EGO-vehicle driving on the original lane with a colliding vehicle driving in the opposite direction.

The intersection event refers to straight crossing path-left (SCP-L), straight crossing path-right (SCP-R), left turn into path (LTIP), right turn into path (RTIP), left turn across path-opposite direction (LTAP-OD), and left turn across path-lateral direction (LTAP-LD), for example. Nonetheless, the event types above are just examples and the disclosure is not limited thereto.

Then, in the video generation step S215, the processor 110 extracts a video segment from the moving video based on the image frame information, and synthesizes the virtual object and the video segment based on the location information of the virtual object to generate a traffic event video corresponding to the event trajectory model. In other words, the real scene (the video segment in the moving video) and a virtual object are synthesized to finally generate the required traffic event video.

The method may also be realized by cloud service, that is, performing calculation by a server. For example, the moving video and the set of moving trajectory coordinates recorded by the front-view lens equipped in the vehicle may be sent back to the server providing the service, and the method is performed by the server to based on the moving video and the set of moving trajectory coordinates sent back to generate the traffic event video.

Figure 3A:
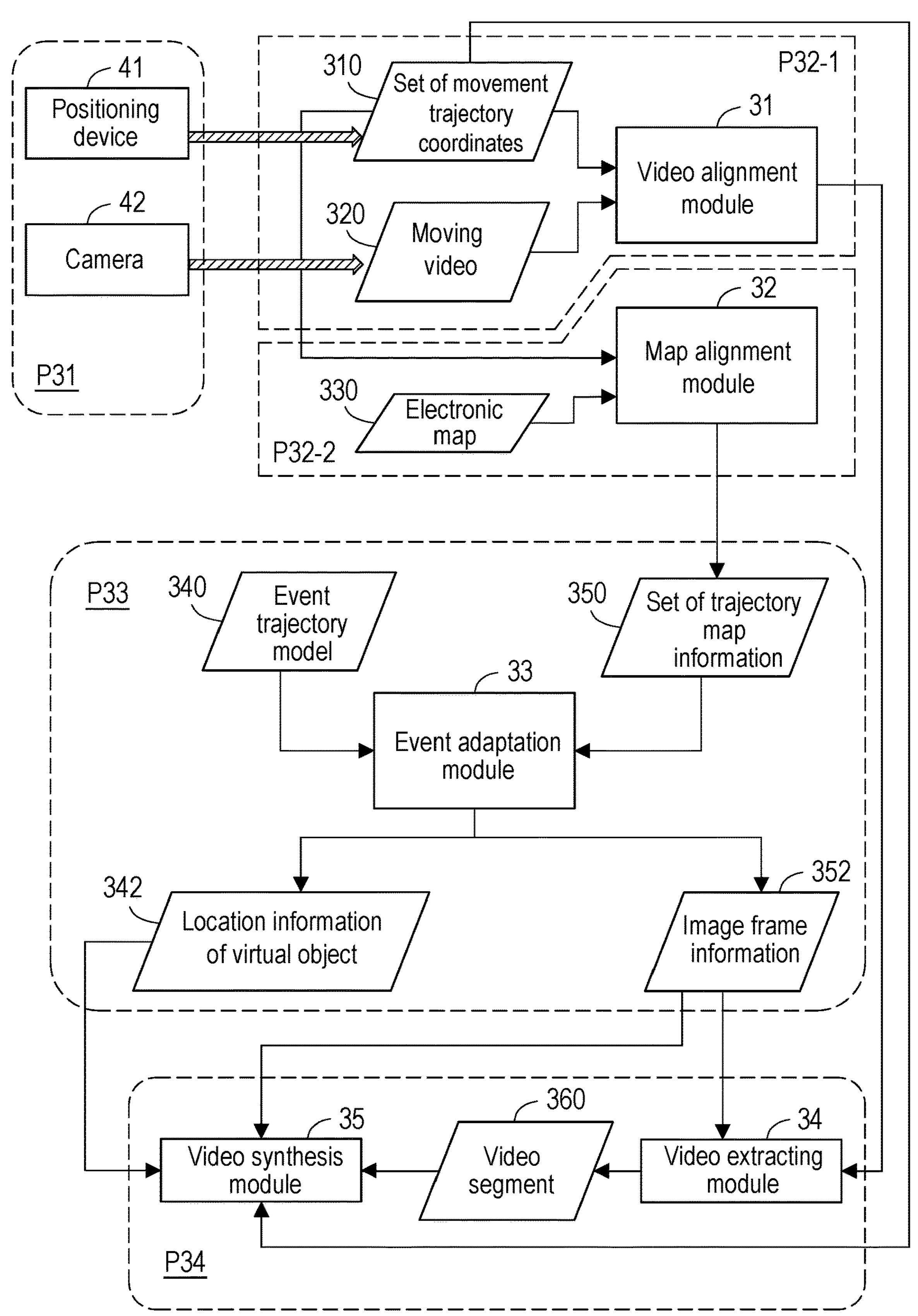
FIG. 3A is a schematic architectural diagram of a method for generating a traffic event video according to another embodiment of the disclosure.
Figure 3B:
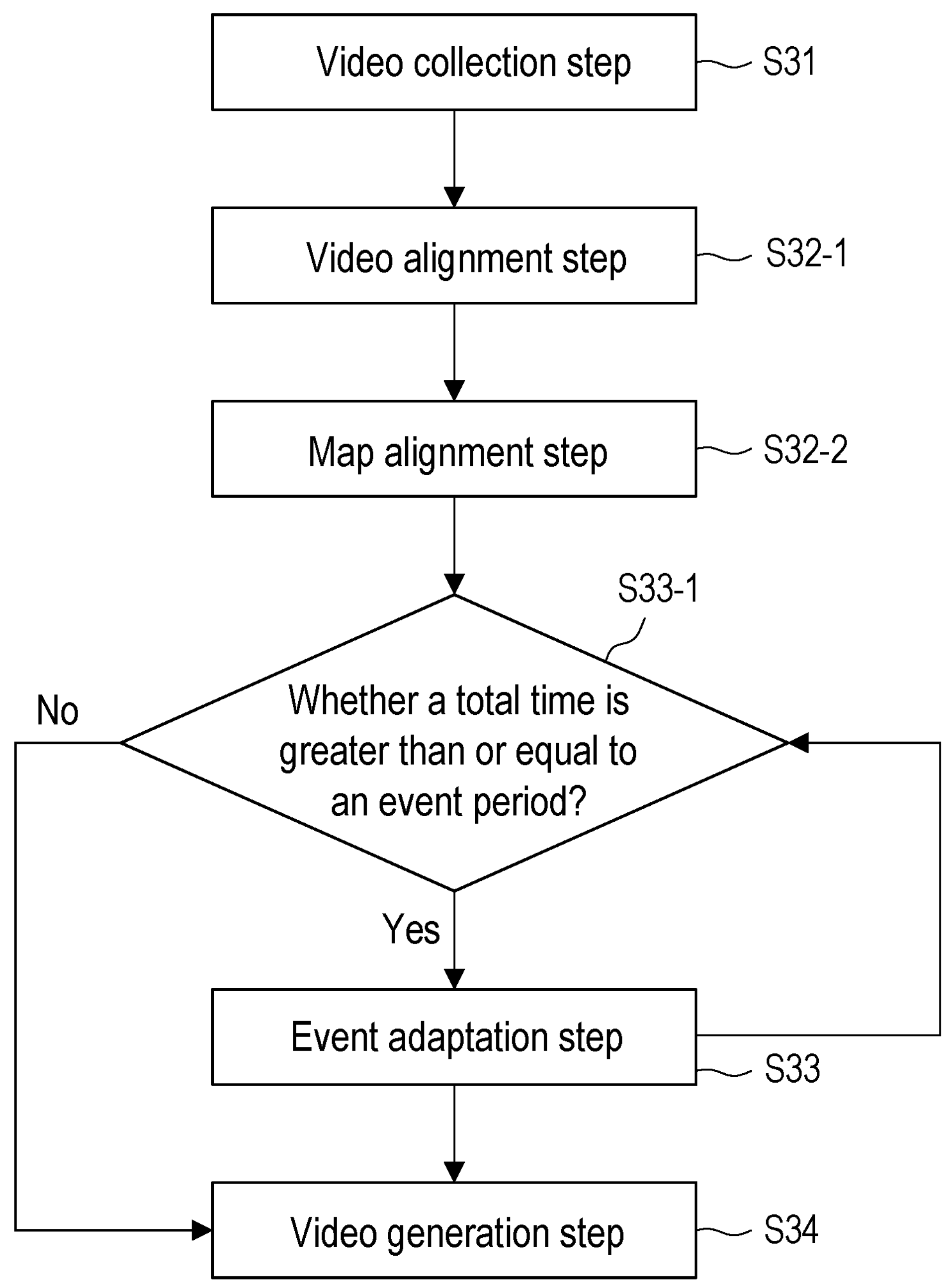
FIG. 3B is a flowchart of a method for generating a traffic event video according to another embodiment of the disclosure.

FIG. 3A is a schematic architectural diagram of a method for generating a traffic event video according to another embodiment of the disclosure. FIG. 3B is a flowchart of a method for generating a traffic event video according to another embodiment of the disclosure. FIG. 3A shows the architecture of the method for generating a traffic event video according to FIG. 3B. The architecture shown in FIG. 3A includes five phases P31, P32-1, P32-2, P33, and P34, which will be described with a video alignment module 31, a map alignment module 32, an event adaptation module 33, a video extracting module 34, and a video synthesis module 35. In an embodiment, each of the modules is composed of one or more programming code snippets, and stored in the storage device 120.

With reference to FIG. 3A and FIG. 3B, first, in step S31, a video collection step is performed, and reference may also be made to the phase P31 of FIG. 3A. Here, a positioning device 41 is utilized to collect a set of moving trajectory coordinates 310, and a camera 42 is utilized to record a moving video 320 from the actual front perspective of driving.

Figure 4:
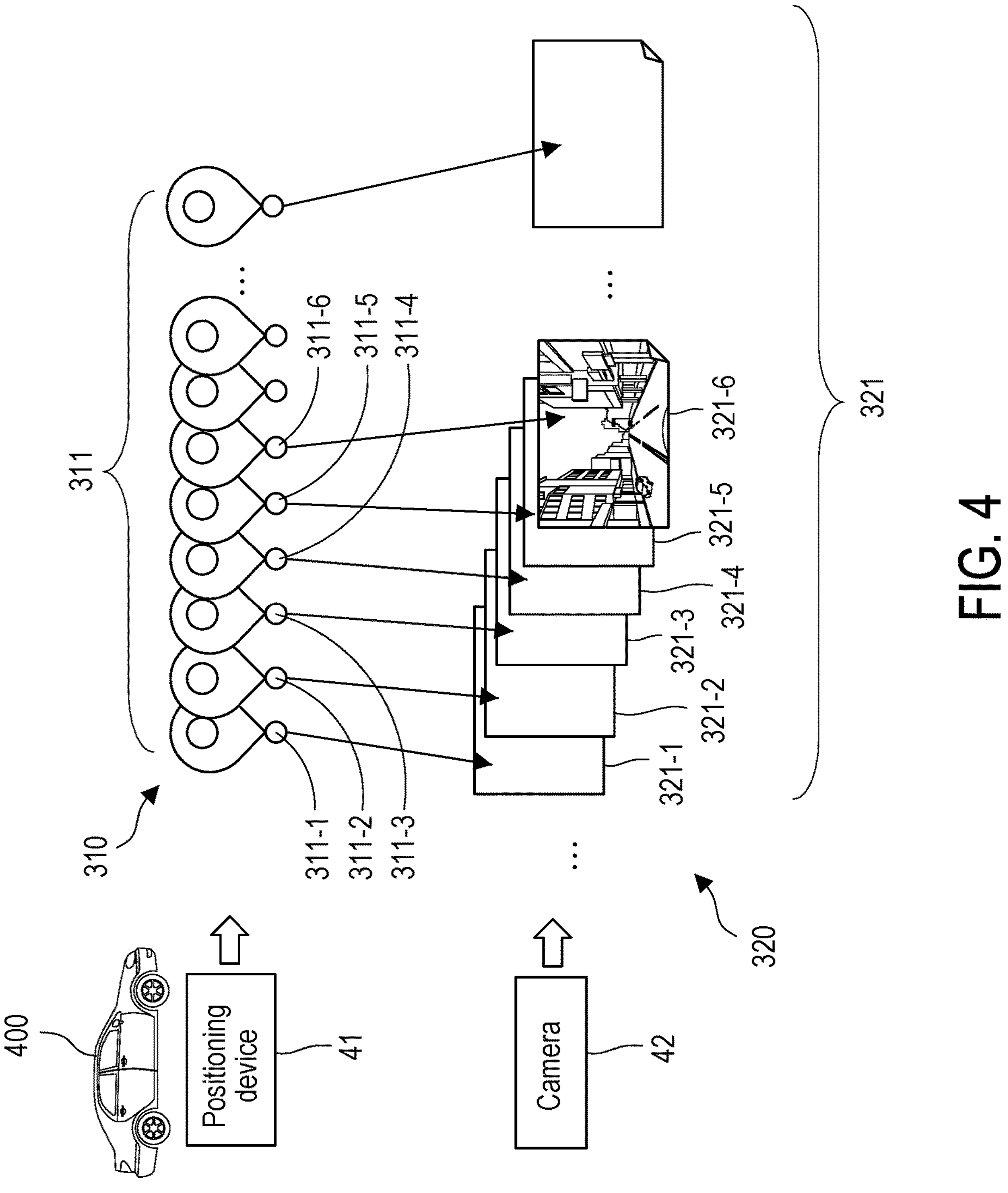
FIG. 4 is a schematic diagram of a video collection step according to an embodiment of the disclosure.

For example, FIG. 4 is a schematic diagram of a video collection step according to an embodiment of the disclosure. With reference to FIG. 4, in this embodiment, a vehicle 400 is adopted for collect the actual driving data. The vehicle 400 is provided with the positioning device 41 and the camera 42. The positioning device 41 is a device adopting a global positioning system (GPS), for example. The camera 42 is a video camera or a photograph camera adopting a charge coupled device (CCD) lens or a complementary metal oxide semiconductor transistor (CMOS) lens, for example.

During the moving process of the vehicle 400, the set of moving trajectory coordinates 310 of the vehicle 400 at a plurality of sampling time points are obtained through the positioning device 41 and the moving video 320 of the front perspective of the moving vehicle 400 is also shot through the camera 42. For example, the positioning device 41 records the current GPS coordinate at certain intervals (e.g., 0.1 second) to obtain the set of moving trajectory coordinates 310. In other words, the set of moving trajectory coordinates 310 includes a plurality of navigation points 311 corresponding to the plurality of sampling time points, and each navigation point 311 is recorded with the corresponding moving trajectory coordinate. The moving video 320 includes a plurality of image frames 321, and each image frame 321 has a respective timestamp.

After the processor 110 obtains the moving video 320 and the corresponding set of moving trajectory coordinates 310, in step S32-1, a video alignment step is performed, and reference may also be made to the phase P32-1 of FIG. 3A. Here, the video alignment module 31 is utilized to time align the moving video 320 with the set of moving trajectory coordinates 310, such that each image frame of the moving video 320 has a corresponding moving trajectory coordinate. In an embodiment, the video alignment module 31 time aligns the moving video 320 with the set of moving trajectory coordinates 310 with the timestamp, such that each image frame 321 of the moving video 320 has a corresponding moving trajectory coordinate.

For example, accompanied with FIG. 4 for description, timestamps obtained by the video alignment module 31 from reading the image frame information of image frames 321-1 to 321-6 are t1 to t6, and the video alignment module 31 extracts navigation points 311-1 to 311-6 whose timestamps are respectively t1 to t6 from the set of moving trajectory coordinates 310. Afterward, the navigation points 311-1 to 311-6 are respectively recorded as moving trajectory coordinates in the image frame information corresponding to the image frames 321-1 to 321-6.

After the video alignment step, in step S32-2, a map alignment step is performed, and reference may also be made to the phase P32-2 of FIG. 3A. Here, the map alignment module 32 map aligns the set of moving trajectory coordinates 310 with the electronic map 330 to obtain a set of trajectory map information 350 corresponding to the set of moving trajectory coordinates 310 in the electronic map 330. Specifically, the map alignment module 32 may first determine a map block where the set of moving trajectory coordinates 310 is located from the electronic map 330. The map block includes a plurality of path node map information. Afterward, the map alignment module 32 compares the moving trajectory coordinates included in the set of moving trajectory coordinates 310 with the path node map information to determine a plurality of trajectory map information from the path node map information, and assemble the trajectory map information to construct the set of trajectory map information 350. The plurality of trajectory map information is respectively the path node map information with the shortest distance to the plurality of moving trajectory coordinates. Determination of the trajectory map information is not limited to the shortest distance. The plurality of trajectory map information may also respectively be a plurality of path node map information within a predetermined radius range taking each of the plurality of moving trajectory coordinates as a center.

Figure 5:
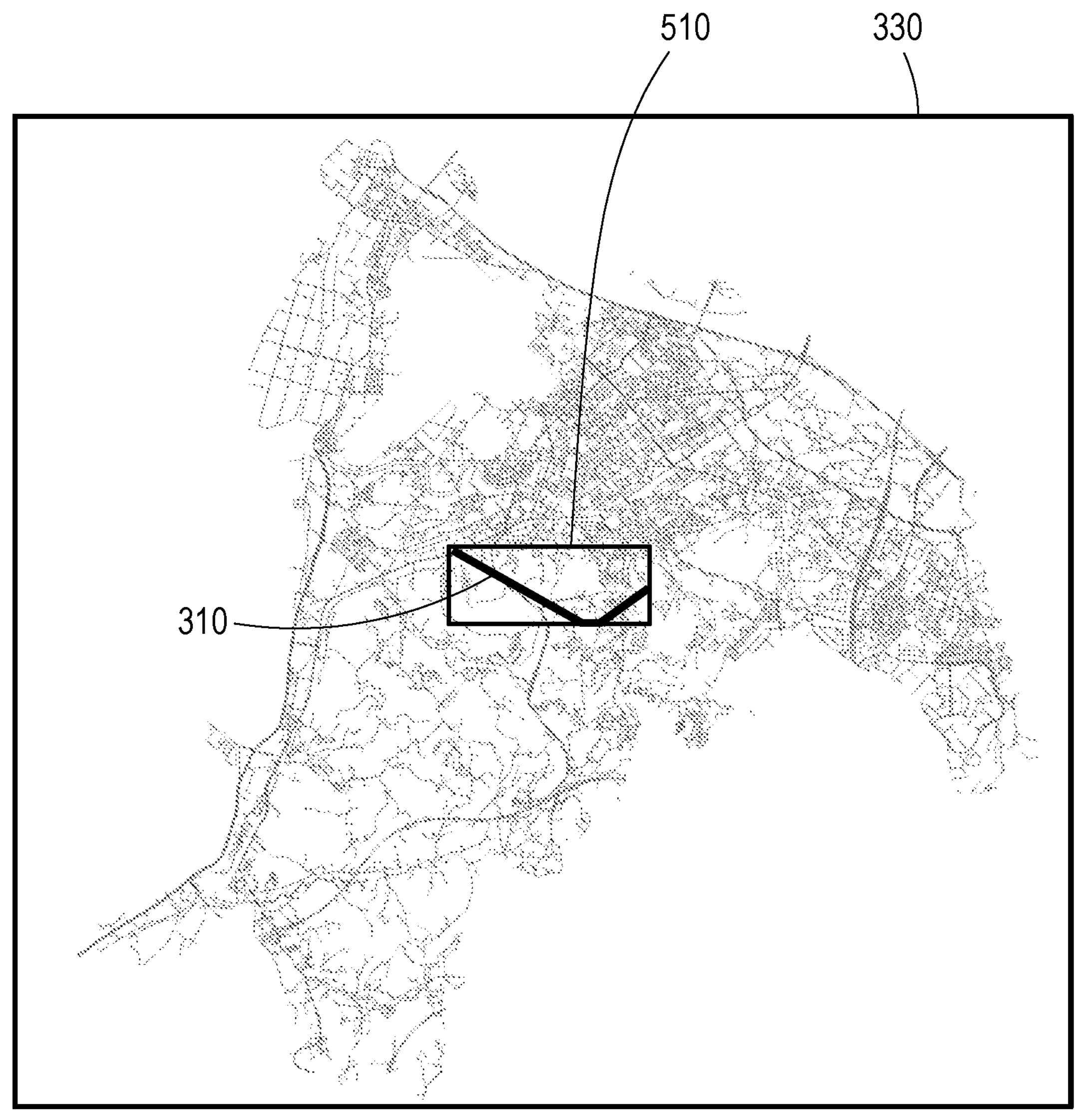
FIG. 5 is a schematic diagram of extracting a map block from an electronic map according to an embodiment of the disclosure.
Figure 6:
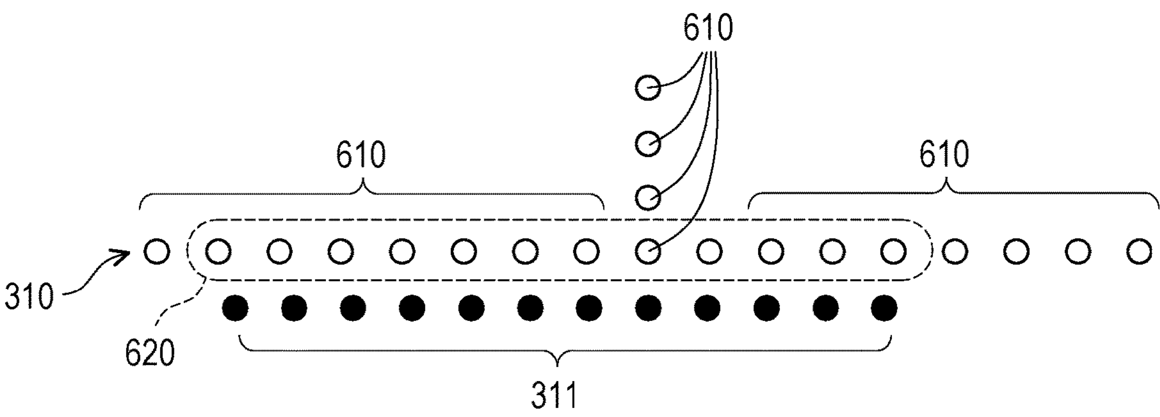
FIG. 6 is a schematic diagram of a map alignment step according to an embodiment of the disclosure.

FIG. 5 and FIG. 6 are taken for further description below. FIG. 5 is a schematic diagram of extracting a map block from an electronic map according to an embodiment of the disclosure. FIG. 6 is a schematic diagram of a map alignment step according to an embodiment of the disclosure, showing some of the moving trajectory coordinates and some of the path nodes.

The processor 110 finds the locations corresponding to the moving trajectory coordinates 311 of the set of moving trajectory coordinates 310 in the electronic map 330 through the map alignment module 32, accordingly finding a map block 510 that covers the set of moving trajectory coordinates 310, as shown in FIG. 5. For example, the set of moving trajectory coordinates 310 on the electronic map 330 is enclosed with the minimal rectangle to obtain the map block 510. Here, the map block 510 includes the plurality of path node map information, which is stored in a manner of R-tree. The path node map information includes a path form and a location coordinate. The path form is an intersection or a road.

Next, with reference to FIG. 6, the hollow circles represent path nodes 610 included in the map block 510 (one path node 610 has path node map information corresponding to the actual electronic map 330), and the solid circles represent the moving trajectory coordinates 311 included in the set of moving trajectory coordinates 310. The plurality of moving trajectory coordinates 311 included in the set of moving trajectory coordinates 310 are compared with the coordinates of the path nodes 610 included in the map block 510 through the map alignment module 32 to find the path nodes (i.e., those framed by the broken line frame) respectively with the shortest distance to the moving trajectory coordinates 311 among the path nodes 610 as matching nodes 620, and the path node map information of the matching nodes 620 are assembled to construct the set of trajectory map information 350. For example, the map alignment module 32 may find one path node 610 with the shortest distance to each of the moving trajectory coordinates 311 as the matching node 620. Alternatively, the map alignment module 32 sets a search range by taking the corresponding coordinate of each of the moving trajectory coordinates 311 in the electronic map 330 as the center and a predetermined length as the radius. Afterward, the path nodes 610 within the search range in the electronic map 330 are taken as the matching nodes 620.

Through the method above, the set of moving trajectory coordinates 310 is converted into the set of trajectory map information 350 on the electronic map 330, and the path node map information provided by the electronic map 330 may be used. For example, the path node map information includes a path form and a location coordinate. The path form is used to indicate that each of the matching nodes 620 is an intersection or a road. After the video alignment step and the map alignment step are performed, the correspondence between each image frame 321 of the moving video 320, the set of moving trajectory coordinates 310, and the set of trajectory map information 350 may be obtained.

Next, before an event adaptation step (corresponding to the phase P33) is performed, in step S33-1, a video length determination step is performed first. Specifically, the event adaptation module 33 first determines whether a total time of the moving video 320 is greater than or equal to an event period of an event trajectory model 340, and when the total time is determined to be greater than or equal to the event period, the flow goes to step S33 and the event adaptation step is performed. After each time of performing the event adaptation step, the total time is updated and the flow returns to step S33-1. When the total time is determined to be less than the event period, the event adaptation step is not performed, and the flow goes to step S34.

In step S33, the event adaptation step is performed, and reference may also be made to the phase P33 of FIG. 3A. At this time, the event adaptation module 33 obtains the event map information conforming to the event trajectory model 340 from the set of trajectory map information 350 and a plurality of image frame information 352 of the video corresponding to the event map information 352 of the set of trajectory map information 350. Moreover, the event adaptation module 33 calculates location information 342 of the virtual object according to the event trajectory model 340. The event trajectory model 340 further includes an object trajectory, for example, the location information corresponding to the movement of an ego-virtual vehicle (i.e., the EGO-vehicle) and/or the movement of a colliding virtual vehicle (i.e., the NEGO-vehicle) corresponding to the event type. Taking the virtual object as a virtual vehicle, the location information 342 of the virtual vehicle corresponding to the image frame information is relative location information.

Specifically, the event adaptation module 33 finds the event map information conforming to the event type and the event path information defined by the event trajectory model 340 from the plurality of trajectory map information included in the set of trajectory map information 350. The event adaptation module 33 determines whether the plurality of trajectory map information of the set of trajectory map information 350 in time sequence conforms to the event type and the event path information o find one or a plurality of event map information conforming to the event type and the event path information; in the video length determination step (step S33-1), the total time is a time length of the moving video 320 from an image frame under determination to the image frame of the latest time.

In the event adaptation step, the event adaptation step is ended when the trajectory map information corresponding to the image frame of the latest time does not conform to the event type and the event path information.

In terms of the intersection event, the processor 110 finds the event map information whose path form is "intersection" and which satisfies the event path information at the same time in the trajectory map information of the set of trajectory map information 350 in time sequence through the event adaptation module 33. Nonetheless, the event adaptation step is ended when performed until the latest trajectory map information in time sequence and none conforms to the path form ("intersection") or the event path information, and the flow goes to step S34. In terms of the road event type, the processor 110 finds the event map information whose path form is "road" or "intersection" and which satisfies the event path information at the same time in the set of trajectory map information 350 in time sequence through the event adaptation module 33. Nonetheless, the event adaptation step is ended when performed until the latest trajectory map information in time sequence and none conforms to the path form ("road" or "intersection") or the event map information. In this embodiment, the location of the event map information is the intersection point of the two parties in the event, for example, the location where the vehicles of the two parties in a traffic accident intersect and collide.

The event path information of the event trajectory model 340 includes conditions to be satisfied for the event type to occur, such as an angle range, a width range, and a moving speed range, specifically referring to that the angle between the roads of the intersection of the occurring event type is required to fall within the angle range, the width of the road or the intersection where the occurring event type is located is required to fall within the width range, and the speed of the virtual object (i.e., the EGO-vehicle) at the location of the event map information (e.g., the intersection point) calculated based on the recorded moving video 320 is required to fall within the determined moving speed range. Accordingly, whether the trajectory map information conforms to the event type may be determined to facilitate subsequently generating a traffic event video. Taking the traffic event type SCP-L as an example, the event path information includes an angle range of 90 degrees and a moving speed range from 40 kilometers per hour to 60 kilometers per hour; taking the traffic event type drifting as an example, the event path information includes a width range greater than 7M and a moving speed range from 40 kilometers per hour to 60 kilometers per hour. When the event adaptation step is performed, a deviation value may be set when determining whether the event path information conforms, and the deviation value may be adjusted to change the accuracy in event adaptation.

Specifically, in the event adaptation step (corresponding to the phase P33), if the event adaptation module 33 finds the trajectory map information conforming to the event type but not conforming to the event path information in the set of trajectory map information 350, it continues to search for the next trajectory map information conforming to the event type; if the event adaptation module 33 finds the trajectory map information conforming to the event type and the event path information from the set of trajectory map information 350, it sets this trajectory map information to the event map information.

After obtaining the event map information, the event adaptation module 33 obtains the moving trajectory coordinate corresponding to the event map information, then determines the image frame of the moving video corresponding to the event map information according to the moving trajectory coordinate, and records the image frame information 352 of the image frame. In this embodiment, the image frame information 352 is a timestamp of the image frame. After the timestamp corresponding to the event map information is obtained, the end time and start time of the occurrence of the event type are calculated according to the event period, and timestamps of image frames of the occurring event type are obtained. For example, assuming that the event period is 10 seconds, and the timestamp of the image frame corresponding to the event map information is 2:30, then the start time of the occurrence of the event type is 2:22, and the end time is 2:31. The event adaptation module 33 records the timestamps of the image frames from time 2:22 to time 2:31.

In addition, after obtaining the image frame information (timestamps) of the image frames of the occurrence of the event type, based on each timestamp, the event adaptation module 33 performs each of: obtaining the moving trajectory coordinate corresponding to the timestamp, calculating and recording the location information of the virtual vehicle at the timestamp, that is, the coordinate of the image frame of the virtual vehicle at the timestamp, according to the corresponding moving trajectory coordinate and event trajectory model. In this embodiment, the location information of the virtual vehicle is a relative location relative to the EGO-vehicle but not limited thereto, and may also be an absolute location. After performing calculation on each of the timestamps of the occurrence of the event type, the event adaptation module 33 obtains and stores the location information of the virtual vehicle at each timestamp.

Another embodiment of calculating the location information of the virtual vehicle will be further described. The event adaptation module 33 extracts the moving trajectory coordinates corresponding to each event map information from the plurality of moving trajectory coordinates included in the set of moving trajectory coordinates 310, and obtains a first event trajectory of the EGO-vehicle, that is, the assembly of moving trajectory coordinates of the image frames of the occurrence of the event type, based on the moving trajectory coordinates. Afterward, a second event trajectory of the NEGO-vehicle, that is, the assembly of the location information of the virtual object in each image frame, is constructed according to the event trajectory model 340 and the first event trajectory. Taking the event type of SCP-L for example, it is assumed that the moving video 320 obtained by the camera 42 is taken as the main perspective screen of the EGO-vehicle, and it is assumed that the timestamps corresponding to an event map information is from 2:22 to 2:31, that is, the start time and end time of the occurrence of the event type. In this case, the moving trajectory coordinates corresponding to the image frames from timestamps 2:22 to 2:31 are assembled to generate the first event trajectory and calculate the second event trajectory moving from the left side of the moving trajectory coordinates to the moving trajectory coordinates, that is, the location information of the virtual object.

In the event adaptation step, after the image frame information (timestamps) of the image frames of the occurrence of the event type and the location information of the virtual vehicle are obtained through the event adaptation step, the event period is subtracted from the total time, and then the total time is updated. Afterward, the flow returns to step S33-1, and the video length determination step is performed according to the updated total time. In other embodiments, the total time may also be updated using the length of the moving video 320 after the latest of the timestamps of the occurrence of the event type, and then the video length determination step is performed according to the updated total time. As a result, the disclosure is not limited to subtracting the event period. In other embodiments, the total time may also be the length of the moving video from an image frame corresponding to the trajectory map information to be performed with the event adaptation step. As a result, the disclosure is not limited to subtracting the event period.

In step S34, a video generation step is performed, and reference may also be made to the phase P34 of FIG. 3A. Here, the video extracting module 34 and the video synthesis module 35 generate a traffic event video according to the information obtained and recorded in the event adaptation step, such as the image frame information 352 and the virtual object location information. In this embodiment, the image frame information 352 is a timestamp of the image frame. To be specific, in the video generation step, the video extracting module 34 extracts the video segment 360 from the moving video 320 based on the image frame information 352, and provides the video segment 360 to the video synthesis module 35. For example, assuming that one set of image frame information 352 is the timestamps of the image frames recorded from 2:21 to 2:30, then the video extracting module 34 extracts the video segment 360 corresponding to 2:21 to 2:30.

Next, the video synthesis module 35 generates the traffic event video corresponding to the event trajectory model 340 based on the object information 342 of the virtual object and the location information of the virtual object corresponding to each timestamp.

Further, each of the image frame information 352 may correspond to one location information of the virtual object. In other words, the video synthesis module 35 may obtain the coordinate of the virtual object in each image frame of the video segment 360. As a result, in the video generation step, the video synthesis module 35 synthesizes the virtual object into the video segment 360 according to the image frame information 352 and the location information of the virtual object to generate the traffic event video.

In addition, a weather effect may also be further added into the synthesized video to obtain traffic event videos under different weather conditions. For example, a weather effect such as rain or fog is added into the synthesized video.

Figure 7A:
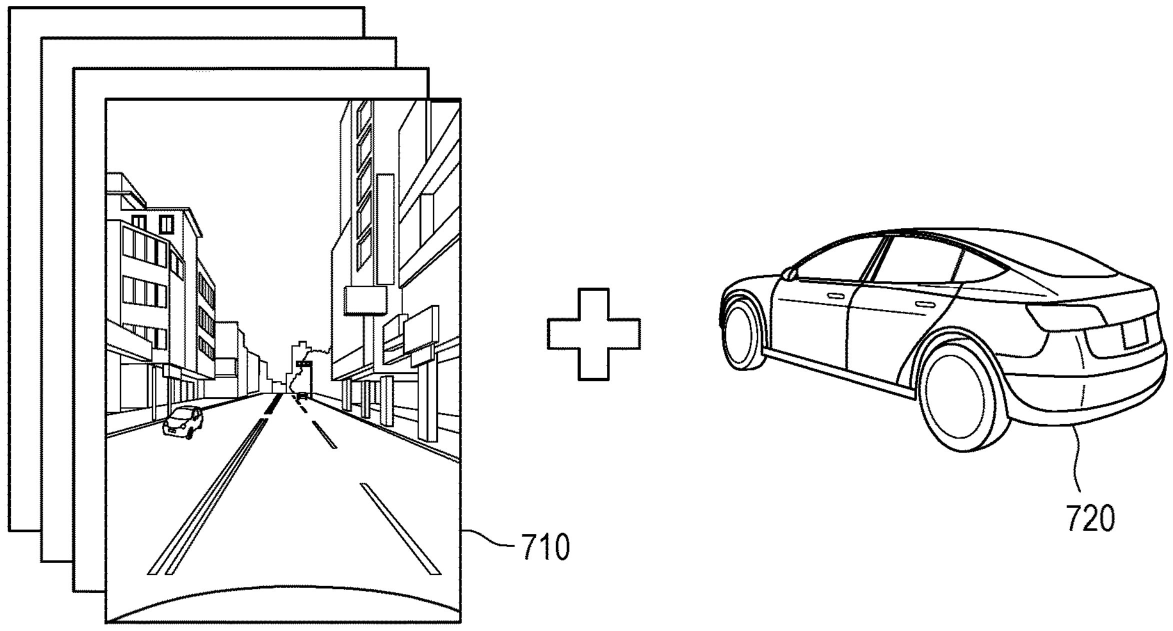
FIG. 7A and FIG. 7B are schematic diagrams of a synthesized video according to an embodiment of the disclosure.
Figure 7B:
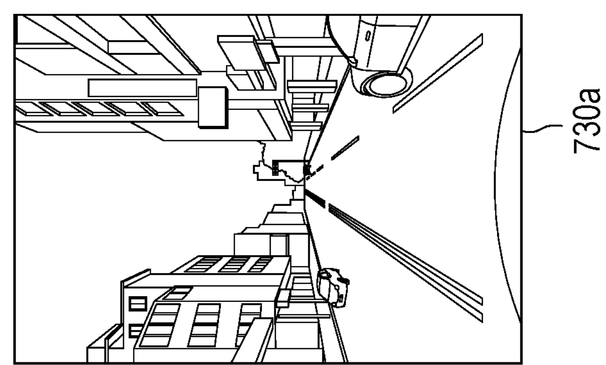
Figure 7B:
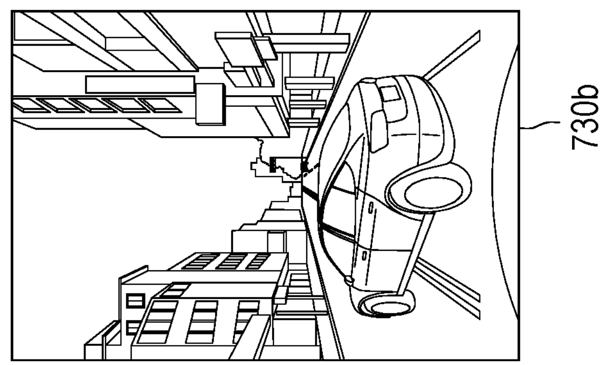
Figure 7B:
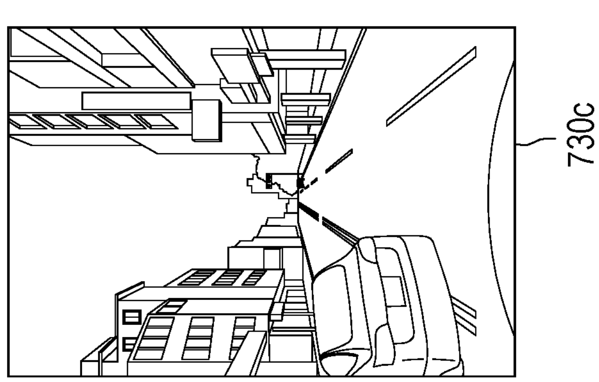
Figure 7B:
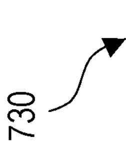
Figure 7B:
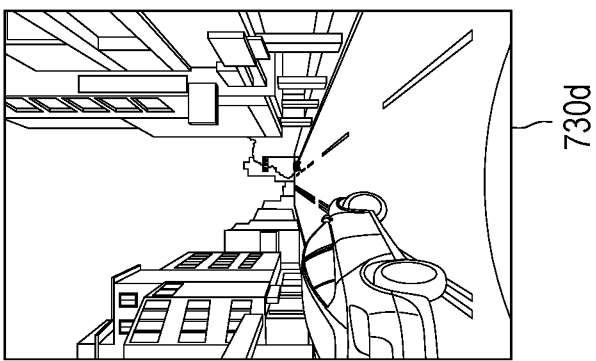

FIG. 7A and FIG. 7B are schematic diagrams of a synthesized video according to an embodiment of the disclosure. With reference to FIG. 7A and FIG. 7B, assuming that the event type recorded in the event trajectory model 340 is “drifting” in this example. A virtual vehicle (NEGO-vehicle) 720 is added into an obtained video segment 710, and a synthesized traffic event video 730 is obtained based on the second event trajectory corresponding to the virtual vehicle 720. In other words, the video segment 710 is taken as a moving screen (as a background screen) with the EGO-vehicle as the main perspective, the postures that should presented by the virtual vehicle 720 corresponding to different time points are set based on the second event trajectory to add the virtual vehicle 720 under different postures into each image frame included in video segment 710 to obtain a plurality of synthesized image frames, as shown in synthesized image frames 730*a* to 730*d*.

In an embodiment of the disclosure, a vehicle traffic event is taken as an example for description. Nonetheless, the moving video may also be a front-view video recorded by a moving unmanned vehicle, the electronic map may also be an aerial map presenting a specific altitude, and the traffic event video of the moving unmanned vehicle is generated through the above-mentioned method for generating a traffic event video. As a result, the disclosure is not limited to a ground traffic event. In addition, in an embodiment of the disclosure, the virtual object takes the NEGO-vehicle as an example, but may also be an animal, such as a pedestrian, a cat, a dog, or relevant objects that may cause a traffic event; the virtual object may also be an aircraft, a bird, or an obstacle in the air that may cause a traffic event in the case of non-ground traffic events.

In summary of the foregoing, in an embodiment of the disclosure, the real scene (the moving video) recorded by the camera is combined with the synthesis of the virtual object to flexibly generate various event trajectory models, and the cost of constructing the environment model of the simulator is reduced to mass-produce the traffic event videos of various event trajectory models in a cost-effective manner. Accordingly, the insufficient number of corner-case datasets in training decision-making systems in the self-driving car industry is addressed to.

In an embodiment of the disclosure, since the actually recorded video is used as the background screen, the traffic flow and traffic environment presented in the background screen are all real scenes. As a result, the traffic event video obtained through an embodiment of the disclosure is more authentic than the environment constructed by the simulator. Compared with the high cost of the environment model established by the simulator, in an embodiment of the disclosure, the traffic event videos corresponding to various event trajectory models can be automatically obtained by several times of real scene shooting. As a result, the resource for executing the simulator is saved and the time consumed for constructing the virtual environment is also saved. In addition, compared with dashboard camera screens collected from the Internet, in an embodiment of the disclosure, various event trajectory models (e.g., corner-cases) may be customized. Moreover, the angle and location of the camera may also be adjusted to customize event trajectory models of different shooting angles during the process of real scene shooting.

Through an embodiment of the disclosure, corner-case traffic event videos that is unlikely to collect can be obtained, one moving video shot in a real scene can be utilized multiple times, and the required traffic event video can be obtained when combined with various event trajectory models. In this way, a small number of real scenes may be utilized to mass-produce traffic event videos (training data sets) conforming to various event trajectory models for training and verification of deep learning models.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for generating a traffic event video, performed by a processor, the method comprising performing:

a map alignment step, map aligning a set of moving trajectory coordinates corresponding to a moving video with an electronic map to obtain a set of trajectory map information corresponding to the set of moving trajectory coordinates from the electronic map;

an event adaptation step, finding at least one trajectory map information, which conforms to an event trajectory model, from a plurality of trajectory map information comprised in the set of trajectory map information as at least one event map information, obtaining a plurality of image frame information of the moving video corresponding to the at least one event map information of the set of trajectory map information, and generating a plurality of location information of a virtual object according to the event trajectory model;

a video generation step, extracting a video segment from the moving video based on the plurality of image frame information, and synthesizing the virtual object and the video segment based on the plurality of location information of the virtual object to generate a traffic event video corresponding to the event trajectory model, wherein the set of moving trajectory coordinates comprises a plurality of moving trajectory coordinates, and the map alignment step further comprises:

determining a map block where the set of moving trajectory coordinates is located from the electronic map, wherein the map block comprises a plurality of path node map information;

comparing the moving trajectory coordinates with the path node map information to determine the plurality of trajectory map information from the plurality of path node map information, wherein each of the plurality of trajectory map information is the path node map information within a predetermined radius range taking each of the moving trajectory coordinates as a center; and assembling the plurality of trajectory map information to generate the set of trajectory map information.

2. The method of claim 1, wherein the moving video comprises a plurality of image frames, and the method further comprises:

a video alignment step, obtaining the moving video and the corresponding set of moving trajectory coordinates, and time aligning the moving video with the set of moving trajectory coordinates, such that each of the image frames of the moving video has a corresponding moving trajectory coordinate.

3. The method of claim 1, wherein the event trajectory model further comprises an object trajectory, an event type, an event period, and event path information, and the event adaptation step further comprises:

finding the at least one event map information conforming to the event type and the event path information from the plurality of trajectory map information comprised in the set of trajectory map information.

4. The method of claim 3, wherein the event type is a road event or an intersection event.

5. The method of claim 3, wherein the virtual object comprises at least one virtual vehicle, and the event adaptation step further comprises:

obtaining at least one moving trajectory coordinate with the shortest distance to the at least one event map information from the set of moving trajectory coordinates according to the at least one event map information;

obtaining the plurality of image frame information corresponding to the at least one moving trajectory coordinate from the moving video, wherein each of the image frame information is a timestamp of the image frame; and based on each of the image frame information:

obtaining the moving trajectory coordinate corresponding to the image frame information; and calculating the location information of the at least one virtual vehicle corresponding to the image frame information according to the moving trajectory coordinate and the event trajectory model.

6. The method of claim 5, wherein each of the location information of the at least one virtual vehicle corresponding to each of the image frame information is relative location information.

7. The method of claim 5, wherein the moving video has a total time, the method further comprises a video length determination step, and the video length determination step comprises:

determining whether the total time is greater than or equal to the event period of the event trajectory model; and performing the event adaptation step when the total time is greater than or equal to the event period, and stopping performing the event adaptation step when the total time is less than the event period, wherein the event adaptation step further comprises updating the total time according to the event period or the latest timestamp after obtaining the plurality of image frame information and the plurality of location information.

8. The method of claim 7, wherein the event adaptation step comprises determining whether each of the trajectory map information in time sequence conforms to the event type and the event path information to find the at least one event map information conforming to the event type and the event path information, and the total time is a time length of the moving video from an image frame under determination to the image frame of the latest time.

9. The method of claim 8, wherein the event adaptation step comprises ending the event adaptation step when the trajectory map information corresponding to the image frame of the latest time does not conform to the event type and the event path information.

10. The method of claim 1, wherein the video generation step further comprises:

adding a weather effect into the video synthesized from the virtual object and the video segment to generate the traffic event video.

11. A method for generating a traffic event video, performed by a processor, the method comprising performing:

a map alignment step, map aligning a set of moving trajectory coordinates corresponding to a moving video with an electronic map to obtain a set of trajectory map information corresponding to the set of moving trajectory coordinates from the electronic map;

an event adaptation step, finding at least one trajectory map information, which conforms to an event trajectory model, from a plurality of trajectory map information comprised in the set of trajectory map information as at least one event map information, obtaining a plurality of image frame information of the moving video corresponding to the at least one event map information of the set of trajectory map information, and generating a plurality of location information of a virtual object according to the event trajectory model;

a video generation step, extracting a video segment from the moving video based on the plurality of image frame information, and synthesizing the virtual object and the video segment based on the plurality of location information of the virtual object to generate a traffic event video corresponding to the event trajectory model, wherein the set of moving trajectory coordinates comprises a plurality of moving trajectory coordinates, and the map alignment step further comprises:

determining a map block where the set of moving trajectory coordinates is located from the electronic map, wherein the map block comprises a plurality of path node map information;

comparing the moving trajectory coordinates of the set of moving trajectory coordinates with the plurality of path node map information to determine the plurality of trajectory map information from the path node map information, wherein each of the trajectory map information is the path node map information with the shortest distance to each of the moving trajectory coordinates; and assembling the plurality of trajectory map information to generate the set of trajectory map information.

12. The method of claim 11, wherein each of the path node map information comprises a path form and a location coordinate.

* * * * *